(12) United States Patent
Riener et al.

(10) Patent No.: US 10,370,753 B2
(45) Date of Patent: Aug. 6, 2019

(54) METHOD FOR APPLYING A PROTECTIVE COATING TO A FLAT STEEL PRODUCT AND FLAT STEEL PRODUCT HAVING A CORRESPONDING PROTECTIVE COATING

(71) Applicant: voestalpine Stahl GmbH, Linz (AT)

(72) Inventors: Christian K. Riener, Linz (AT); Gerhard Angeli, Traun (AT); Klaus Hofer, Feldkirchen an der Donau (AT); Wilhelm Fischer, Enns (AT)

(73) Assignee: VOESTALPINE STAHL GMBH, Linz (AT)

( * ) Notice: Subject to any disclaimer, the term of this patent is extended or adjusted under 35 U.S.C. 154(b) by 211 days.

(21) Appl. No.: 14/425,215

(22) PCT Filed: Aug. 28, 2013

(86) PCT No.: PCT/EP2013/067781
§ 371 (c)(1),
(2) Date: Mar. 2, 2015

(87) PCT Pub. No.: WO2014/033153
PCT Pub. Date: Mar. 6, 2014

(65) Prior Publication Data
US 2015/0225831 A1    Aug. 13, 2015

(30) Foreign Application Priority Data
Sep. 3, 2012  (EP) .................................... 12182842

(51) Int. Cl.
C23C 2/00      (2006.01)
C23C 2/06      (2006.01)
(Continued)

(52) U.S. Cl.
CPC .............. C23C 2/06 (2013.01); B32B 15/013 (2013.01); C22C 18/04 (2013.01); C23C 2/40 (2013.01); *Y10T 428/12799* (2015.01)

(58) Field of Classification Search
CPC .................................... C23C 2/06; C23C 2/40
See application file for complete search history.

(56) References Cited

U.S. PATENT DOCUMENTS 6,235,410 B1 * 5/2001 Komatsu .................... C23C 2/06
                                                        420/519
6,465,114 B1 * 10/2002 Honda ...................... C23C 2/02
                                                        148/264

(Continued)

FOREIGN PATENT DOCUMENTS

EP    1199376 A1    4/2002
EP    1466994 A1    10/2004
(Continued)

OTHER PUBLICATIONS

Machine Translation of JP 2002-285311, dated Feb. 19, 2018. (Year: 2002).*

(Continued)

*Primary Examiner* — David P Turocy
(74) *Attorney, Agent, or Firm* — McCormick, Paulding & Huber LLP

(57) ABSTRACT

The invention relates to a method for applying a protective coating (10) to a flat steel product (100), wherein the protective coating (10) is produced by guiding the flat steel product (100) having a strip entry temperature of 400-490 degrees Celsius through a molten zinc alloy bath. The molten zinc alloy bath (11) has a bath temperature of 400-480 degrees Celsius and contains an aluminum fraction and a magnesium fraction. In particular, the molten zinc alloy bath (11) has the following composition: the aluminum fraction is in the range between 1.8 and 3.0 weight percent;

(Continued)

the magnesium fraction is in the range between 1.3 and 2.7 weight percent; the aluminum fraction in weight percent is greater than the magnesium fraction in weight percent; the ratio of the magnesium fraction in weight percent to the sum of the aluminum fraction in weight percent and the magnesium fraction in weight percent is in the range between 0.31 and 0.44; and the remainder of the molten zinc alloy bath is zinc and unavoidable impurities.

9 Claims, 10 Drawing Sheets

(51) Int. Cl.
    *B32B 15/01*     (2006.01)
    *C22C 18/04*     (2006.01)
    *C23C 2/40*     (2006.01)

(56) References Cited

U.S. PATENT DOCUMENTS

| | | | | |
|---|---|---|---|---|
| 9,181,614 | B2 * | 11/2015 | Diez | C23C 2/06 |
| 2009/0297881 | A1 * | 12/2009 | Maalman | C23C 2/06 |
| | | | | 428/659 |
| 2010/0323095 | A1 * | 12/2010 | Barjon | C23C 2/003 |
| | | | | 427/8 |
| 2013/0239884 | A1 * | 9/2013 | Koga | C23C 2/003 |
| | | | | 118/63 |

FOREIGN PATENT DOCUMENTS

| | | | |
|---|---|---|---|
| EP | 1621645 | A1 | 2/2006 |
| EP | 1857566 | A1 | 11/2007 |
| EP | 2119804 | A1 | 11/2009 |
| EP | 2703515 | A1 | 3/2014 |
| GB | 1125965 | A | 9/1968 |
| JP | 2002285311 | A | 10/2002 |
| WO | 2006/002843 | A1 | 1/2006 |
| WO | 2008/102009 | A1 | 8/2008 |
| WO | 2012091385 | A2 | 7/2012 |
| WO | WO 2012091385 | A2 * | 7/2012 ............ C23C 2/06 |

OTHER PUBLICATIONS

International Search Report for PCT Application PCT/EP2013/067781 dated Oct. 1, 2013.
Solidification Structure of the Coating Layer on Hot-Dip Zn-11% Al-3% Mg-0.2% Si-coated Steel Sheet by K. Honda et al., Materials Transaction, vol. 49, Nr. 6, 2008, pp. 1395-1400.

* cited by examiner

METHOD FOR APPLYING A PROTECTIVE COATING TO A FLAT STEEL PRODUCT AND FLAT STEEL PRODUCT HAVING A CORRESPONDING PROTECTIVE COATING

CROSS-REFERENCE TO RELATED APPLICATION

This application is entitled to the benefit of and incorporates by reference subject matter disclosed in International Patent Application No. PCT/EP2013/067781 filed on Aug. 28, 2013 and European Patent Application EP1218284.0 filed Sep. 3, 2012.

FIELD OF THE INVENTION

The present invention relates to a method permitting the coating of flat steel products with a zinc-based protective coating. The invention also concerns steel products, such as a steel strip or steel sheet, to which at least on one of the sides of the flat steel product a zinc-based protective coating has been applied. It also extends to a steel product with a corresponding protective coating. It claims priority to Application EP 12182842.0, which was filed on Sep. 3, 2012.

BACKGROUND OF THE INVENTION

It has long been known to improve the corrosion resistance of flat steel products 100, such as steel strips or steel sheets, by coating them with a zinc alloy. In practice, this mostly takes place when the steel product comes out of a furnace and is introduced into a zinc alloy bath 11, as is indicated with the aid of an exemplary apparatus 200 in FIG. 10. In order to protect the flat steel product 100 from oxidation, the product typically passes through a sleeve 12 into the zinc alloy bath. In the bath 11, the flat steel product 100 is redirected by a roller 13, and moved upwardly out of the bath 11. Upon leaving the bath 11, the adhering melted film of the steel product 100 is stripped off by means of a gas stream from the nozzles 14 of a jet stripping unit to the target size, and the flat steel product 100 is then transferred to a cooling zone 15. Upon leaving the zinc alloy bath 11, the band-shaped flat steel product 100 rips with it a quantity of alloy that is dependent upon conveyor speed. The quantity of alloy is a multiple of the desired alloy plating. With the directed stream (nitrogen, air, or a mixture thereof at 10-70° C.) from the nozzles 14 (preferably wide flat nozzles are used), so much of the melted alloy is stripped off until the desired plating remains on the flat steel product 100. The coating thickness is among others a function of the conveyor speed, of the blow-off pressure and of the spacing of the nozzles 14 from the band-shaped flat steel product 100. The coating thickness of the zinc alloy on the flat steel product 100 can therefore be influenced by the nozzles 14. In addition, however, inherent properties of the alloy composition play a role. This continuously operating process is generally called hot-dip coating.

For a long time, so-called Zn—Mg—Al-coating systems are used, which develop an outstanding corrosion protection effect even at low coating thicknesses. The metallurgical performance of such a complex Zn—Mg—Al-coating system in a hot-dip bath 11, from a thermodynamic point of view, is only achieved with effort and simplifying assumptions have to be made in order to be able to simulate the hot-dip bath 11 itself and the covering of the flat steel product 100 with a protective coating in such a hot-dip bath 11. This is partly because the process of hot-dip coating is a dynamic process in which the flat steel product 100 is introduced into the bath 11 and removed from the bath 11 in a continuous process. Moreover, the composition of the bath 11, i.e., the locally present concentrations of the individual alloy components, can momentarily change locally and also the temperature distribution can vary slightly. There are already numerous investigations and patent applications, each dealing with partial aspects of the Zn—Mg—Al-coating systems in the hot-dip bath 11. Examples are mentioned in the following:

GB 1,125,965: This older patent document describes a Zn—Mg—Al-coating system in which the following large range for alloy compositions (in weight percent) are defined: $1<Mg<4$ and $0.05<Al<5$. Specific embodiments and the technical teachings of this older patent document refer either to Zn—Mg—Al-coating systems and hot-dip baths whose alloy has specifically one of the following alloy compositions (1. to 5.):
1. Mg=2 weight %, Al=4 weight %;
2. Mg=2.4 weight %, Al=3.2 weight %;
3. Mg=2.4 weight %, Al=3.8 weight %;
4. Mg=2.49 weight %, Al=4.39 weight %;
5. Mg=2.5 weight %, Al=4.5 weight %;

or to Zn—Mg—Al-coating systems and hot-dip baths whose alloy has specifically one of the following alloy compositions (6. to 9.):
6. Mg=2.77 weight %, Al=0 weight %;
7. Mg=2.97 weight %, Al=0.12 weight %;
8. Mg=3 weight %, Al=0 weight %;
9. Mg=3 weight %, Al=0.2 weight %;

WO2006/002843: This patent application describes a Zn—Mg—Al-coating system in which the alloy composition (in percent weight) is defined as follows: $0.3<Mg<2.3$ and $0.6<Al<2.3$. According to the teachings of this patent application a relatively large window extending between 0.3 weight percent and 2.3 weight percent is spanned for the magnesium component. In order not to adversely affect weldability, the teachings of this patent application state that the aluminum component should be set at a maximum of 2.3 weight percent.

EP 1 621 645 A1: This patent application describes a Zn—Mg—Al-coating system in which aluminum and magnesium in a ratio of 1:1 are used. This document explains that the sum of these alloy elements should not be too high because of the slag formation in the bath. The technical teaching of EP 1 621 645 A1 says among other things that beyond 2.3 weight percent aluminum and 2.3 weight percent magnesium one obtains an increasingly brittle coating in which the surface quality is noticeably deteriorated. Therefore, according to this patent application, a range between 0.6 and 1.3 weight percent of aluminum and 0.6 to 1.3 weight percent of magnesium is proposed.

WO 2012 091385 A2: This patent application also describes a Zn—Mg—Al-coating system wherein here besides Zn—Mg—Al a fourth element (for example silicon or lithium) is added to the bath. According to this patent application [Al/(Al+Mg)] should lie in the range between 0.38 and 0.48. This range information can be converted into the following statement: $0.61*Mg<Al<0.77*Mg$. From this follows that the technical teaching of WO 2012 091385 A2 states that always more magnesium than aluminum should be present in the melt.

EP 1857566 A1: This patent application describes again a Zn—Mg—Al-coating system, in which further substances (for example, Pb, Si and others) are added in small quantities. The technical teaching of this document states that above all an alloy bath is preferred that contains between 0.15 and 0.4 weight percent aluminum and 0.2 to 2.0 weight percent magnesium. This patent application describes that one achieves an optimal combination of high corrosion resistance and optimized weldability by application of the described technical teachings.

EP 2119804 A1: This patent application also describes a Zn—Mg—Al-coating system, in which additional substances in small quantities (up to 0.3 percent weight) are added. The technical teachings of this document state that above all an alloy bath is preferred that contains between 2 and 8 weight percent aluminum and 0 to 5 weight percent magnesium. The task of this patent application is the reduction of the waviness of the solidified metallic protective coating.

The technical publication "Solidification Structure of the Coating Layer on Hot-Dip Zn-11% Al-3% Mg-0.2% Si-coated Steel Sheet" by K. Honda et al., Materials Transaction, Vol. 49, Nr. 6, 2008, pages 1395-1400, describes a Zn—Mg—Al-coating system that is produced from a bath with 11 weight percent aluminum, 3 weight percent magnesium and 0.2 weight percent silicon. It is reported that with the aid of the solidification structure it could be determined that—unlike in the state of equilibrium—$MgZn_2$ instead of $Mg_2Zn_{11}$ could be observed. Apparently, in the particular experimental set-up and under the specified conditions $MgZn_2$ is formed as a metastable structure (called Laves-Phase), whereas $Mg_2Zn_{11}$ does not. Additional information about this topic can be taken from the thesis of E. De Bruyker on "Zn—Mg—Al Alloy Coatings: thermodynamic analysis and microstructure related properties", Dissertation, Univ. Gent, 2006.

There are also technical approaches, which are mainly applied in products from Asia, in which the eutectic solidification point is not reached over a eutectic valley. These approaches, however, lie typically in the hypereutectic range with over 5 weight percent per alloy element. From European Patent Application EP 1 466 994 A1 for example such an approach is known that produces a metal product whose Zn—Mg—Al protective coating contains between 2 and 19 weight percent aluminum and between 1 and 10 weight percent magnesium.

Besides the pure protection against corrosion, there are however always progressing requirements in terms of surface quality of zinc-coated flat steel products. Above all, the automotive industry, but also the construction sector, expect products that satisfy the highest requirements towards surfaces.

The application of a zinc-based protective coating is a very dynamic process, which especially on a large industrial scale is determined by numerous parameters and influential factors. In the last few years various attempts were undertaken to operate the hot-dip zinc coating apparatus (as for example the apparatus 200 shown in FIG. 10) such that the quality of the surface provided with the zinc-based protective coating could be increased with consistently good protection against corrosion by the metallic coating. In addition, the ternary Al—Mg—Zn phase diagram of a ZnAlMg-melt presents a very complex system with numerous intermetallic phases including binary as well as ternary type. Providing homogeneous surfaces is therefore not trivial.

The main problems with this are often surface flaws that may occur during solidification of the ZnAlMg protective coating due to selective oxidation of the melt film.

Further aspects, which should be considered in providing of a suitable ZnAlMg protective coating, are the economics, the sensible use of valuable resources, and above all the energy expense, which must be made in production.

It is therefore the object to provide a method as well as the corresponding flat steel products which have corrosion technically an especially durable and robust protective coating, whereby the surface of the protective coating should be especially homogeneous and smooth. A surface quality is strived for that meets the highest requirements of the customer.

Additionally, this method should be as little as possible energy-consuming, cost-effective, simple and reproducible.

SUMMARY OF THE INVENTION

According to the invention, a continuous (hot-dip coating) method is provided that allows a flat steel product to be provided with a metallic (protective) coating that protects the steel substrate of the flat steel product against corrosive attack and other external influences.

According to the invention, a metallic bath with a ZnMgAl alloy is provided. This ZnMgAl alloy is composed according to the following new alloy concept:
- the aluminum component (in weight percent) is larger than the magnesium component (in weight percent);
- the aluminum component (in weight percent) lies in the range between 1.8 and 3.0 weight percent;
- the magnesium component (in weight percent) lies in the range between 1.3 and 2.7 weight percent;
- the ratio of the magnesium component (in weight percent) to the sum of the aluminum component (in weight percent) and the magnesium component (in weight percent) lies in the range between 0.31 to 0.44;
- the remainder are zinc and unavoidable impurities.

According to the invention, these unavoidable impurities are in all embodiments in a range which is considerably less than 1 weight percent (wt %).

According to the invention, a metallic bath is provided with a ZnAlMg alloy preferably in all embodiments, as follows:
- the aluminum content (weight percent) is in the range between 2 and 2.9 weight percent;
- the magnesium content (weight percent) is in the range between 1.5 and 2.4 weight percent;
- the ratio of the magnesium content (weight percent) to the sum of the aluminum content (weight percent) and the magnesium content (weight percent) is in the range from 0.34 to 0.40;
- the remainder being zinc and unavoidable impurities.

The specific description of the new ZnAlMg alloy concept is given in the following specification and analysis. In particular, in connection with specific analyses, the composition of the bath was varied in the range of 2.0 to 2.9 Al in percent weight and 1.5 to 2.4 Mg in percent weight. The new ZnMgAl alloy concept was determined from basic thermodynamic considerations and simplified models derived from there. With the aid of practical experiments, it can be proven that the alloy concept leads indeed to very good results. It has been shown that the melt and its solidification on a flat steel product are causally related to the visual appearance and the qualities of the solidified surface, and that a controlled specification of solidification characteristics brings forth excellent results. Corresponding solidification curves can serve as rough guidelines to better understand the practical implementation.

Since apparently several different phases and alloys coexist during solidification of the ZnMgAl alloy and interact thermodynamically with one another, a practicable way was sought to find a different solidification path as before. The objective is to form as closely as possible a so-called ternary eutectic of the metals Zn, Al, and Mg during solidification of the protective coating. Previously, essentially two different phases are present in the bath before the final solidification of this ternary eutectic. These two phases are a primary zinc phase and a binary eutectic.

It is important that the present alloy concept allows more degrees of freedom (in the sense of a larger production window) for the optimization of the stripping process at emerging from the melt bath and during stripping by means of nozzles, which is very advantageous from a process-technical and economic point of view. With this, one is able to also adjust and optimize the physical parameters (preferably the slit opening d of the nozzles and/or the distance z of the nozzles from the steel strip) during emerging and stripping in wide ranges in addition to the pure optimization of the alloy composition of the bath, in order to achieve the desired overall result.

According to the invention, it is possible with the stripping after the emerging to clearly reduce the occurrence of flaw formation (such as ZnAlMg stripping disturbance and faults in surface topography). Additionally it is possible to achieve the adjustment of the physical parameters (slit opening d of the nozzles and/or the distance z of the nozzles from the steel strip) during emerging and stripping in larger parameter windows than before, without having such adjustments lead to an increase in error formation on the steel strip.

According to the invention also the so-called wet storage stain resistiveness at the seam after a salt spray test of the flat steel product will be increased with the inventive protective coating, which is a significant advantage over other alloy systems.

According to the invention in the course of solidification up to reaching the tertiary eutectic (at approx. 343° C.) neither $MgZn_2$ nor an aluminum rich phase should crystallize, but as far as possible only zinc.

According to the invention, the new alloy concept is selected in a way that with solidification mainly the primary zinc dendrites are formed. The composition of the melt can however drift from the ideal composition according to the invention through variations in the alloy output caused by substrate, treatment-speed and stripping-pressure-condition, as well as through minimal fluctuations in the alloy content of the zinc-magnesium-aluminum blocks to be charged, whereby—not intended—shortly before reaching the ternary eutectics still one of the two eutectic valleys (either the Mg-rich furrow or the aluminum-rich furrow) can be encountered. This leads then in addition to the primary zinc crystallization in minimal degree also to binary crystallization of $MgZn_2$ and Zn and/or aluminum-rich zinc phase. I.e., $MgZn_2$-regions and/or aluminum-regions or phases, respectively, can form. The content in the—unintentionally—binary crystallized Mg- or Al-rich phase in the fully solidified Zn—Al—Mg-coating is always less than 10 weight percent, but predominantly less than 5 weight percent.

The development of the new alloy concept goes back to theoretical considerations in equilibrium situations, various simulations and their implementation in concrete, practical experiments. It was shown that the theory can be approximately transferred to the practice, even if it is mostly based on static alloy baths or correspondingly from alloy baths in equilibrium. Mainly, also experiments in industrial production scale have been conducted. From there it can be determined that it is important to exclude the thermodynamically preferred $Mg_2Zn_{11}$-phase. If this $Mg_2Zn_{11}$-phase is excluded, a different solidification path than before results. This solidification path will here simply be referred to as a quasi-single-phase solidification path, since the solidification path is specified in a targeted fashion such that until reaching the solidification point of the ternary eutectics substantially only one phase is crystallizing. By specifying a specific alloy composition, the solidification path is influenced so that consequently a quasi-single-phase solidification path results which achieves relatively directly the point of the ternary eutectic. The new alloy concept therefore does not go the path in direction of a eutectic valley and then along the furrow up to the point of the ternary eutectic.

According to the invention, the quasi-single-phase solidification path is predetermined such that the ternary eutectic of the metals Zn, Al and Mg forms almost immediately after the primary zinc-phase. One forces the course of the solidification of the alloy on the flat steel product by specifying the ratio of the aluminum content (in weight percent) to magnesium content (in weight percent) in the desired direction. This way, the quasi-single-phase solidification path is imposed.

According to the invention, this single-phase path or solidification path is guided or controlled preferably in all embodiments such that it is mainly characterized by the primary solidification of zinc dendrites (Z).

According to the invention, the solidification behavior of the ZnAlMg protective coating is especially well suited, in order to obtain in the subsequent process of stripping after the emersion a ZnAlMg protective coating that corresponds in quality and coating thickness to the modern requirements in the automotive sector and in other areas. In particular, with the invention the energy cost was optimized such that still a good solidification behavior is achieved.

Investigations have shown that the optimized alloy concept is reflected as well in the microstructure of the ZnAlMg protective coating produced as in the reduced error rate of the surface of this ZnAlMg protective coating. Such a ZnAlMg protective coating consists of clearly fewer areas with the binary eutectic (BE) (or binary eutectic structures) and mainly shows zinc dendrites and the ternary ZnAlMg-eutectic (TE) (or ternary eutectic structure). In practice, this ZnAlMg protective coating can possibly have a slight rest of Al-regions or phases and/or binary eutectics of Zn and $MgZn_2$ phase.

Preferably, the solidification process on the flat steel product in all embodiments is so specified or controlled that the solid content before solidification of the ternary eutectic lies in the range between approximately 0.4 and 0.6 (mole fraction of the solid matter in the bath). This window range could be derived from the solidification curve on a theoretical basis and could be confirmed with the aid of polished cross-sectional images of the protective coatings, which have been produced according the inventive method.

Preferably the solidification process on the flat steel product in all embodiments is specified or controlled, respectively, such that the solids content before the final eutectic solidification, i.e. before reaching the eutectic point, is below 55%.

Preferably, the new alloy concept of the invention is applied to so-called hot-dip coated flat steel products.

The invention makes it possible to eliminate coating adhesion problems or to clearly reduce them in contrast to other ZnAlMg protective coatings. It forms a very stable and surface-homogeneous structure as a protective coating.

Other than with the prior art, the aluminum content and the magnesium content are selected such that clearly less magnesium is present in the melt bath in comparison to the aluminum content. The magnesium content is according to the invention in all embodiments always 21%-45% less than the aluminum content, that is, the invention provides an asymmetric combination of the aluminum content and the magnesium content. Furthermore, it is provided that the aluminum content together with the magnesium content in all embodiments is smaller than 5.7% by weight, with a maximum of 3.0% by weight for the aluminum content and a maximum of 2.7% by weight for the magnesium content. Preferably, the aluminum content together with the magnesium content in all embodiments is smaller than 5.3% by weight, with a maximum of 2.9% by weight for the aluminum component and a maximum of 2.4% by weight for the magnesium component.

Other than with the prior art, according to the invention the alloy constituents (especially the aluminum content and the magnesium content) were selected such that as small an energy consumption as possible (or an optimal energy balance) is achieved. On the one hand, the direct energy consumption for melting, coating, and stripping plays a role. On the other hand, however, above all also the energy cost of the added ingredients clearly must be booked.

Larger aluminum and magnesium contents than those, which due to metallurgical conditions for yielding outer-skin compatible surface qualities, appear under these (environmental/energy) aspects not reasonable. In this regard, the invention offers a clear advantage over other alloy systems that provide high aluminum and magnesium contents.

The inventive alloy concept represents an optimum regarding

- minimal beneficial alloy content in regard to the outer-skin surface quality,
- avoidance of secondary crystallization in the region of the eutectic valley of the Zn-rich ternary system Zn—Al—Mg, in particular $MgZn_2$-phase,
- improved corrosion durability in numerous application areas (in comparison to zinc- and zinc-iron-coatings),
- an application that is resource-conserving in the sense of the product cycle, ecologically reasonable and sustainable.

The invention can be applied as well to hot—as to cold-rolled steels and the corresponding flat steel products.

Further advantageous embodiments of the invention form the subject matter of the dependent claims.

BRIEF DESCRIPTION OF THE DRAWINGS

Embodiments of the invention are described in more detail in the following with reference to the drawings.

DETAILED DESCRIPTION OF THE PREFERRED EMBODIMENTS

According to the invention, a ZnMgAl alloy bath 11 (see for example FIG. 10) is concerned. This alloy bath 11 and the alloy produced therefrom (protective coating 10 in FIG. 9) comprise substantially the three components Zn, Al, and Mg and possibly unavoidable impurities. Preferably, these unavoidable impurities in all embodiments of the invention lie in a range that is clearly smaller than 1 weight percent.

The state of a corresponding alloy is determined by three variables namely by the temperature T and two content specifications (concentration specifications). With these, the content of the third component is also defined. For such ternary systems a two dimensional illustration of the phase diagram is not possible and therefore a three dimensional illustration is used. The base surface of this illustration describes the contents and in the space above the temperature plotted. Single-phase and multi-phase regions form in this illustration three-dimensional bodies. A corresponding exemplary representation can be seen in FIG. 2A, which will be described later.

Figure 1A:
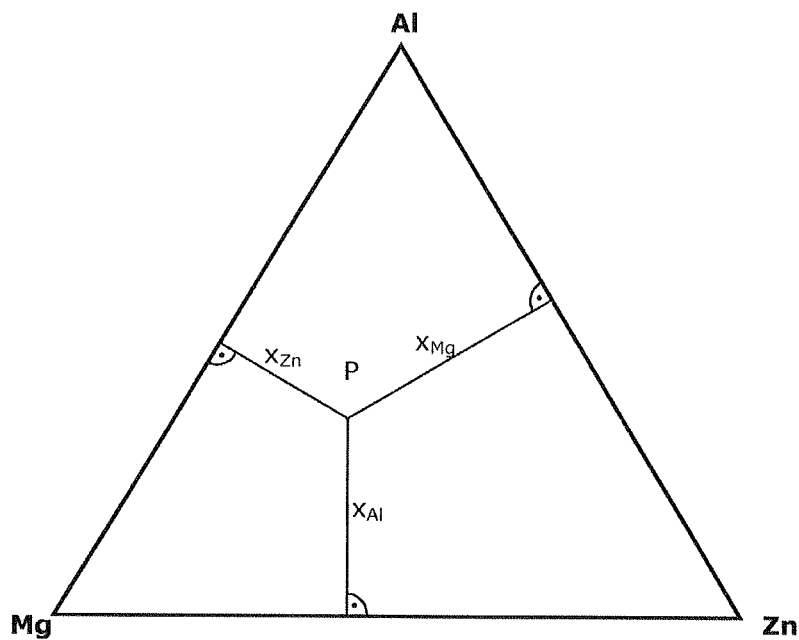
FIG. 1A shows a schematic representation of a content triangle of a ZnAlMg-alloy bath.

The base surfaces of a ternary phase diagram can be illustrated as content triangles, as is shown in FIG. 1A for a ZnAlMg alloy. The content of the three components Zn, Al, and Mg are represented by $x_{Zn}$, $x_{Al}$, and $x_{Mg}$. Since only two contents are independent of one another, the three contents can be illustrated as a point in the content triangle. The following applies:

$$x_{Zn}+x_{Al}+x_{Mg}=100\% \quad [1]$$

The specifications (contents) in weight percent (wt %) of the three components Zn, Al, and Mg together with possible impurities always yield the sum 100.

Figure 1B:
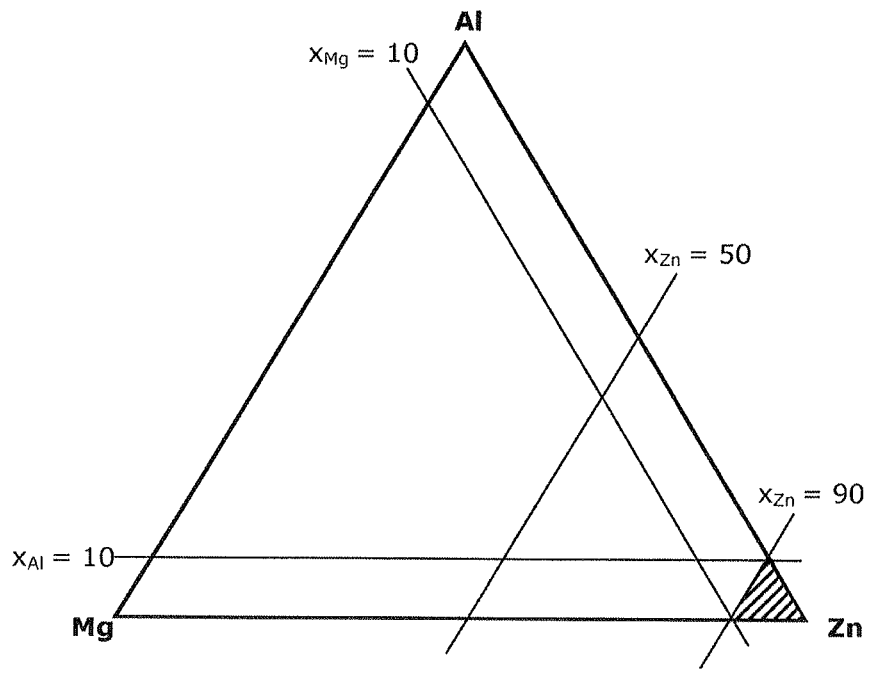
FIG. 1B shows a schematic representation of a content triangle of FIG. 1A in which coordinate lines are shown and the zinc-rich region is shown hatched.

In FIG. 1A the point P may represent an exemplary alloy. Then the distances of the point P from the sides of the equal-sided triangle correspond to the three contents $x_{Zn}$, $x_{Al}$, and $x_{Mg}$. That is to say, for each point in an equal-sided triangle, the sum of the three distances from the sides is the same as the height of the triangle. The height of the triangle is set equal to 100%. For ease of reading a triangular coordinate grid is inserted. Since the invention concerns a zinc-rich bath in which the zinc component is larger than 90%, that is $x_{Zn}>90$, the lower right corner of the content triangle is of particular importance. In FIG. 1B, the following lines of the triangular coordinate grid are plotted: $x_{Zn}=50$ and $x_{Zn}=90$ as parallels to the leg Mg—Al; $x_{Mg}=10$ as a parallel to the leg Al—Zn; and $x_{Al}=10$ as a parallel to the leg Mg—Zn. For alloys with a zinc component that is larger than 90% therefore the hatched triangle of FIG. 1B is to be closely observed.

Depending on the dimensioning of the axes of the triangular coordinate grid from such illustrations either specification in wt % (weight percent) or specification in at % (atomic percentage) can be read The difference between wt %-specification and specification in at % is approximately a factor of 2.4 based on the alloy elements aluminum and magnesium. In the context of the present description and the illustrations wt % is given, if not explicitly stated otherwise.

Figure 1C:
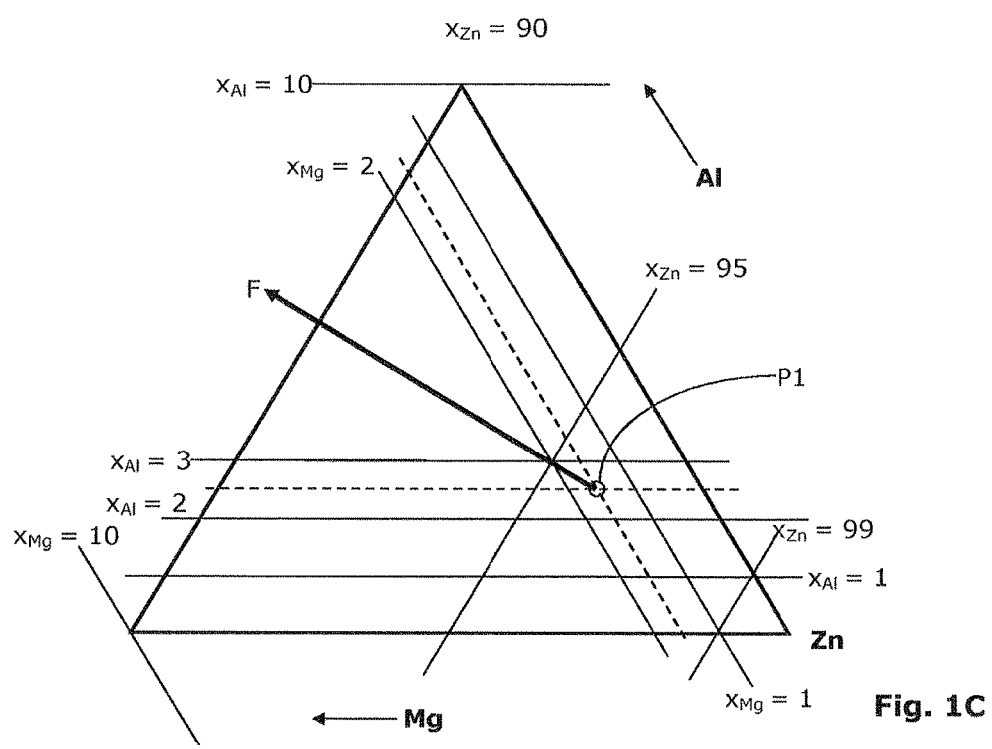
FIG. 1C shows a schematic enlargement of the zinc-rich region of FIG. 1B in which coordinate lines are shown and the quasi-one-phase solidification path of the invention is schematically shown.

In FIG. 1C the hatched triangle from FIG. 1B is enlarged and shown without hatching. In FIG. 1C the following lines of the triangular coordinate grid are plotted (specification in wt %): $x_{Zn}=90$, $x_{Zn}=95$, and $x_{Zn}=99$ as parallels to the leg Mg—Al; $x_{Mg}=10$, $x_{Mg}=2$, and $x_{Mg}=1$ as parallels to the leg Al—Zn, as well as $x_{Al}=10$, $x_{Al}=3$, $x_{Al}=2$, and $x_{Al}=1$ as parallels to the leg Mg—Zn.

According to the invention the ratio of the magnesium content (in weight percent) to the sum of the aluminum content (in weight percent) and the magnesium content (in weight percent) lies in the range between 0.31 to 0.44. Especially preferred is the range between 0.35 to 0.40. The following Table 1 shows some preferred pairs of numbers that have been determined on the basis of test series.

TABLE 1

| Example (experiment) | Aluminum in wt % (x) | Magnesium in wt % (y) | Equation [2] y/(x + y) |
|---|---|---|---|
| 1.1 | 2 | 0.9 | 0.31 |
| 1.2 | 2 | 1.1 | 0.355 |
| 1.3 | 2 | 1.3 | 0.394 |
| 2.1 | 2.3 | 1.4 | 0.378 |
| 2.2 | 2.3 | 1.6 | 0.41 |
| 2.3 | 2.3 | 1.8 | 0.439 |
| 3.1 | 2.5 | 1.4 | 0.378 |
| 3.2 | 2.5 | 1.6 | 0.39 |

TABLE 1-continued

| Example (experiment) | Aluminum in wt % (x) | Magnesium in wt % (y) | Equation [2] y/(x + y) |
|---|---|---|---|
| 3.3 | 2.5 | 1.8 | 0.419 |
| 4.1 | 2.7 | 1.4 | 0.341 |
| 4.2 | 2.7 | 1.6 | 0.372 |
| 4.3 | 2.7 | 1.8 | 0.4 |

If the last column in Table 1 is sorted in ascending order, the following range of values from 0.31 to 0.44 (rounded from 0.439) results, as is shown in the last column of Table 2.

TABLE 2

| Example (experiment) | Aluminum in wt % (x) | Magnesium in wt % (y) | Equation [2] y/(x + y) |
|---|---|---|---|
| 1.1 | 2 | 0.9 | 0.31 |
| 4.1 | 2.7 | 1.4 | 0.341 |
| 1.2 | 2 | 1.1 | 0.355 |
| 4.2 | 2.7 | 1.6 | 0.372 |
| 2.1 | 2.3 | 1.4 | 0.378 |
| 3.1 | 2.5 | 1.4 | 0.378 |
| 3.2 | 2.5 | 1.6 | 0.39 |
| 1.3 | 2 | 1.3 | 0.394 |
| 4.3 | 2.7 | 1.8 | 0.4 |
| 2.2 | 2.3 | 1.6 | 0.41 |
| 3.3 | 2.5 | 1.8 | 0.419 |
| 2.3 | 2.3 | 1.8 | 0.439 |

The relation between the magnesium content (in weight percent) and the aluminum content (in weight percent) can be described according to the following equation [2]:

$$0.31*y/(x+y)<0.44 \quad [2]$$

The range and limit specification of equation [2] can be converted into the following statement:

$$1.56*Mg<Al*2.22*Mg \quad [3]$$

Further, it can be established that the magnesium content (in weight percent) for all embodiments behaves proportional to the aluminum content (in weight percent), as can be learned from the two middle columns in Table 1. Table 3 reproduces the same experimental series, whereby the values of the last column in Table 3 are sorted in ascending order.

TABLE 3

| Example (experiment) | Aluminum in wt % (x) | Magnesium in wt % (y) | Equation [4] x − y |
|---|---|---|---|
| 2.3 | 2.3 | 1.8 | 0.5 |
| 1.3 | 2 | 1.3 | 0.7 |
| 2.2 | 2.3 | 1.6 | 0.7 |
| 3.3 | 2.5 | 1.8 | 0.7 |
| 1.2 | 2 | 1.1 | 0.9 |
| 2.1 | 2.3 | 1.4 | 0.9 |
| 3.2 | 2.5 | 1.6 | 0.9 |
| 4.3 | 2.7 | 1.8 | 0.9 |
| 1.1 | 2 | 0.9 | 1.1 |
| 3.1 | 2.5 | 1.4 | 1.1 |
| 4.2 | 2.7 | 1.6 | 1.1 |
| 4.1 | 2.7 | 1.4 | 1.3 |

The alloy composition of the ZnAlMg melt in the zinc bath is adjusted according to the invention based on analysis of the course of theoretically calculated cooling curves. It should be noted that the cool-down (cooling rate), on which the simulation is based, is different from the actual cooling rate during galvanizing. The trend is, however, the same for theoretically determined cooling curves with exclusion of Mg$_2$Zn$_{11}$ and the actual galvanizing. A cooling curve according to FIG. 6 therefore serves as a kind of clue or guideline.

Figure 4:
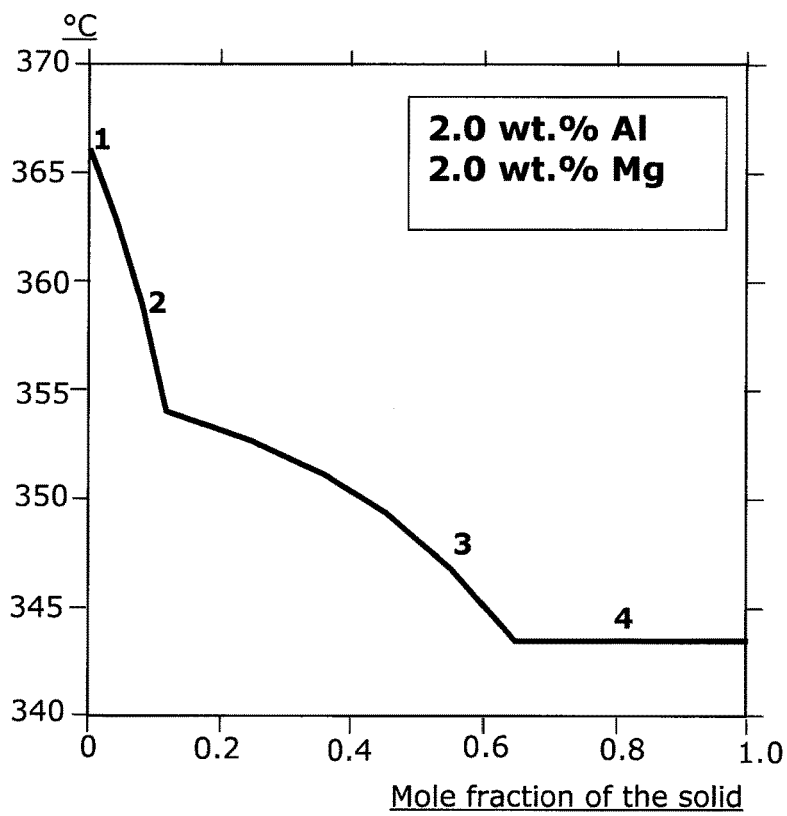
FIG. 4 shows a schematic representation of a classical solidification curve of an Al—Mg—Zn bath that consists of 2.0 weight percent aluminum and 2.0 weight percent magnesium.
Figure 5:
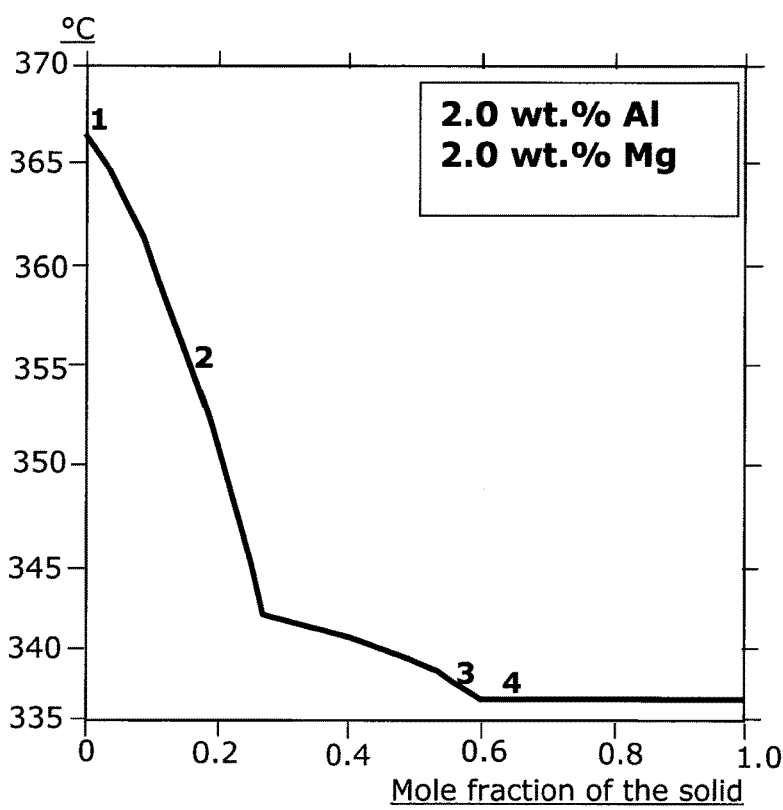
FIG. 5 shows a schematic representation of a solidification curve of an Al—Mg—Zn bath that consists of 2.0 weight percent aluminum and 2.0 weight percent magnesium, in which the $Mg_2Zn_{11}$-phase was excluded.

In FIG. 4 a first cooling curve is shown with a conventional composition of a ZnAlMg bath with 2.0 weight percent Al and 2.0 weight percent Mg. In FIG. 5, a cooling curve is shown with a conventional composition of a ZnAlMg bath with 2.0 weight percent Al and 2.0 weight percent Mg, where now for the calculation of the cooling curve the thermodynamically preferred Mg$_2$Zn$_{11}$ phase was deliberately excluded.

Figure 6:
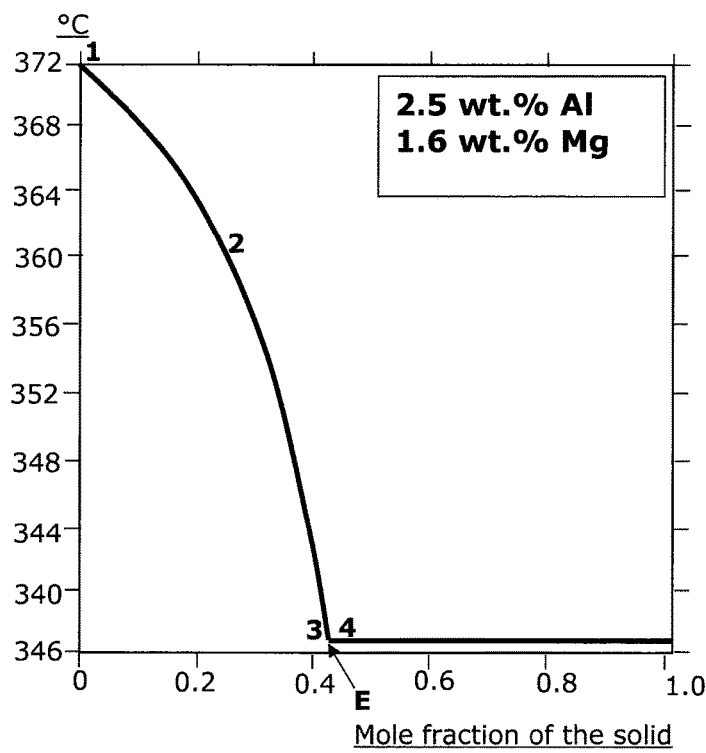
FIG. 6 shows a schematic representation of a theoretically determined solidification curve of an Al—Mg—Zn bath of the invention, that consists of exemplary 2.5 weight percent aluminum and 1.6 weight percent magnesium; here the $Mg_2Zn_{11}$-phase was excluded, too (the eutectic point is designated by E)

In FIG. 6, however, a theoretical cooling curve is shown, which reflects an inventive composition of a ZnAlMg bath with 2.5 weight percent Al and 1.6 weight percent Mg, whereby also here for the calculation of the cooling curve the thermodynamically preferred Mg$_2$Zn$_{11}$ phase was excluded. Referring to FIG. 6 it can be seen that by excluding the Mg$_2$Zn$_{11}$ phase and by defining a special relationship between the aluminum content (in weight percent) and the magnesium content (in weight percent), an almost direct transition from the solidification of the zinc dendrites (trace 2 in these figures) to the solidification of ternary eutectic TE occurs (trace 4 in these figures). The point of the ternary eutectic is (as well as in the FIGS. 2 and 3) designated by "E". Furthermore, from the theoretical cooling curve of FIG. 6 can be learned that the transition to the solidification of ternary eutectic TE (trace 4) lies in the range between 0.4 and 0.6. Preferably, in all embodiments of the invention the solid content in the bath is below 50%, i.e. in the range <0.5.

The cooling curves in FIGS. 4, 5 and 6 show the solidification of a defined melt (Zn, Al and Mg contents) whereby the nature of the resulting phase and solid fraction (X-axis; mole fraction of the solid which forms in the bath) is plotted versus temperature (Y-axis; in degrees Celsius). The area designated with "1" in these diagrams represents the liquid phase in the bath. "2" refers to the solidification of the primary zinc dendrites. In FIG. 4 the melt in the bath begins to solidify at approximately 367° C. and in FIG. 5 solidification begins at approximately 367° C., too, and in FIG. 6 at approximately 372° C. "3" refers to the solidification of binary eutectic and "4" refers to the area of the ternary eutectic solidification, which according to the invention comprises areas/zones with pure zinc, areas/zones with MgZn$_2$ alloys and very small areas/zones with Al phase. The actual values may differ slightly in practice from the theoretical values of the cooling curves, but a qualitative statement is possible.

FIG. 4 shows a standard cooling curve calculated from the known ternary system Zn—Al—Mg (with 2.0 weight percent Al and 2.0 weight percent Mg), whereby, as common until now, the thermodynamically preferred Mg$_2$Zn$_{11}$ phase was not excluded. For FIG. 5, however, not the standard cooling curve calculated from the known ternary system of Zn—Al—Mg was used, but rather a modified form of this curve. The modification was a computational exclusion of the thermodynamically preferred Mg$_2$Zn$_{11}$ phase, because this phase could not be detected in solidified and industrially produced layers.

With reference to FIG. 6 it can be seen that the theoretically determined freezing curve has changed significantly compared to previous approaches. The freezing curve of FIG. 6 shows no binary eutectic BE or only a negligible fraction of the binary eutectic BE.

The relationship between the magnesium content (in weight percent) and the aluminum content (in weight percent) can alternatively also be described by the following equation [4], in which the limits 0.5 and 1.3, have been taken from the last column of Table 3:

$$0.5 * x - y * 1.3 \quad [4]$$

Particularly preferably these limits lie for all embodiments at 0.5 and 1.1.

Figure 7:
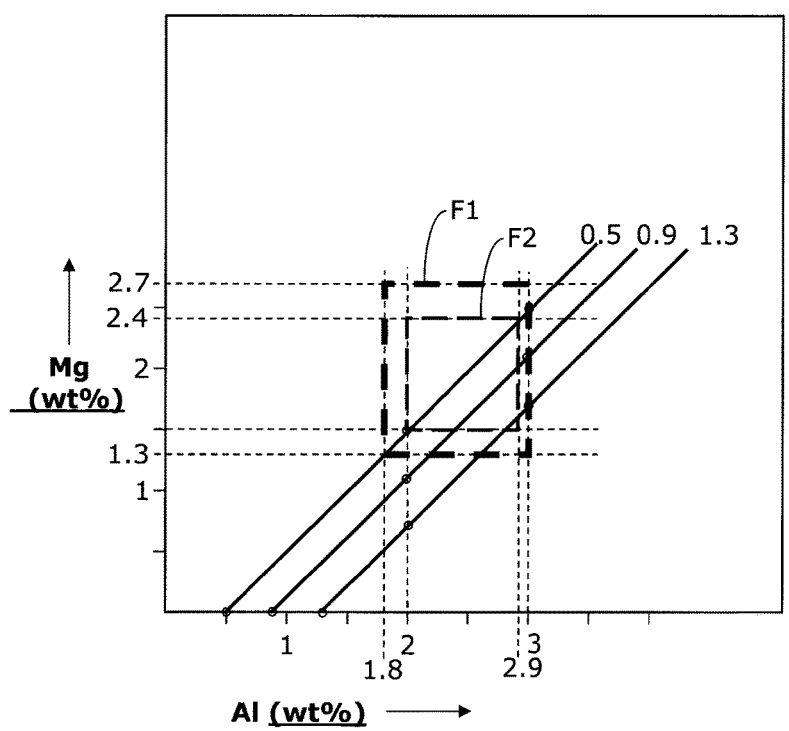
FIG. 7 shows a schematic representation of an exemplary combination according to the invention of the aluminum content and the magnesium content.

Equation [4] defines a proportional relationship between the magnesium content (weight percent) and the aluminum content (weight percent). In all embodiments of the invention preferably a linear proportional relationship exists, which is shown graphically in FIG. 7. In FIG. 7 three corresponding lines are shown, wherein x is plotted on the horizontal axis and y is plotted on the vertical axis. x corresponds to the proportion of aluminum in weight percent and y is the magnesium content in weight percent. In FIG. 7, a window F1 is sketched, which defines a particularly preferred range of the invention. The window F1 displays the region in which the aluminum content is in the range between 1.8 and 3.0 weight percent and the magnesium content is in the range between 1.3 and 2.7 weight percent. More preferred is the window F2 indicating the range in which the aluminum content is in the range between 2 and 2.9 weight percent and the magnesium content is in the range between 1.5 and 2.4 weight percent.

In general it can be determined that the alloy of the invention is characterized in that the aluminum content (weight percent) and the magnesium content (weight percent) is in the range of the window F1, that the magnesium content (in weight percent) behaves proportional to the aluminum content (in weight percent) and that the magnesium content (in weight percent) is always significantly smaller than the aluminum content (in weight percent). The relationship is therefore asymmetric.

Unlike with the above-listed exemplary prior art, the aluminum fraction x and the magnesium fraction y are chosen such that much less magnesium compared to aluminum in the melt bath is present (this statement does not apply to the document GB 1,125,965). The following Table 4 was derived from Table 1, wherein the percentage of magnesium compared to aluminum used, i.e. provided, in the melt according to the invention is given in the last column. In the left column, the results of the investigation of a series of experiments of the invention are shown according to a simplified evaluation scheme. Particularly advantageous results in terms of the task are identified by a (+++). Not quite as great but still good results are characterized by a (++). Good results are indicated by a (+).

TABLE 4

| Example (experiment) | Aluminum in wt % (x) | Magnesium in wt % (y) | y in percent of x (with x = 100%) |
|---|---|---|---|
| 1.1/(+) | 2 | 0.9 | 45 |
| 1.2/(+) | 2 | 1.1 | 55 |
| 1.3/(+) | 2 | 1.3 | 65 |
| 2.1/(+) | 2.3 | 1.4 | 60.87 |
| 2.2/(++) | 2.3 | 1.6 | 69.57 |
| 2.3/(+++) | 2.3 | 1.8 | 78.26 |
| 3.1/(+) | 2.5 | 1.4 | 56 |
| 3.2/(+++) | 2.5 | 1.6 | 64 |
| 3.3/(++) | 2.5 | 1.8 | 72 |
| 4.1/(+) | 2.7 | 1.4 | 51.85 |
| 4.2/(++) | 2.7 | 1.6 | 59.26 |
| 4.3/(+++) | 2.7 | 1.8 | 66.67 |

From Table 4 it can be seen that in all embodiments maximum 78.26% (rounded up to 79%) magnesium compared to aluminum content has to be used. These calculations are based in each case on wt % (weight percent) and can be converted into at % (atomic percent) data.

Preferably, the following statement is true in terms of alloy composition for all embodiments:

the aluminum content (in weight percent) is in the range between 2 and 2.9 weight percent;
the magnesium content (in weight percent) is in the range between 1.5 and 2.4 weight percent, wherein
the ratio of magnesium content (in weight percent) to the sum of the aluminum component (in weight percent) and the magnesium component (in weight percent) is in the range between 0.35 to 0.44 particularly preferably in the range of 0.31 to 0.40.

Particularly advantageous results in terms of the quality of the protective coating and surface properties are obtained if the following linear relation is selected:

$$x=y-0.9 \quad [5]$$

and provided that the aluminum content (in weight percent) lies in the range between 1.8 and 3.0 weight percent and the magnesium content (in weight percent) lies in the range between 1.3 and 2.7 weight percent (as the window F1 in FIG. 7 represents).

Very particularly preferred results provides a composition with an aluminum content (in weight percent) of 2.5 and a magnesium content (in weight percent) of 1.6. The illustration in FIG. 1C is a schematic representation. In FIG. 1C, the corresponding point in the content triangle is referred to as P1. The desired quasi-single-phase solidification path that leads in the direction of the ternary eutectic point is in FIG. 1C simplistically indicated by an arrow F pointing to the upper left. It should be noted here that the arrow F is straight because it is a projection of the three-dimensional representation (see FIG. 2A) into the plane of the content triangle. The actual quasi-single-phase solidification path F* is a curve running along a curved surface to the eutectic point E, as can be learned from FIG. 2A. This ternary eutectic point E (see also FIGS. 2A and 2B) lies, according to literature, at a composition of 93.7 wt % Zn, 2.4 wt % Mg and 3.9 wt % Al at 343° C.

Figure 2A:
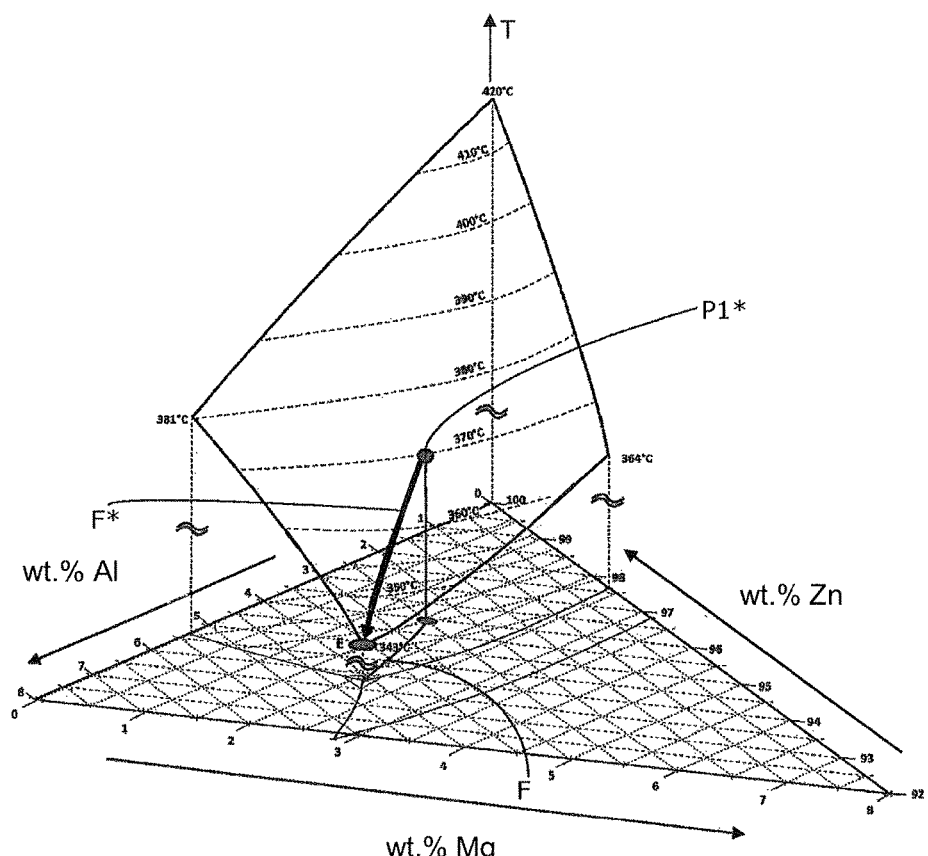
FIG. 2A shows a 3-dimensional representation in which the components of the ternary system Al—Mg—Zn are in the two dimensional region, and the temperature (T) is plotted on the upward pointing axis. From this representation the course of the status point (that is, the quasi-one phase solidification path) according to the invention can be learned.
Figure 2B:
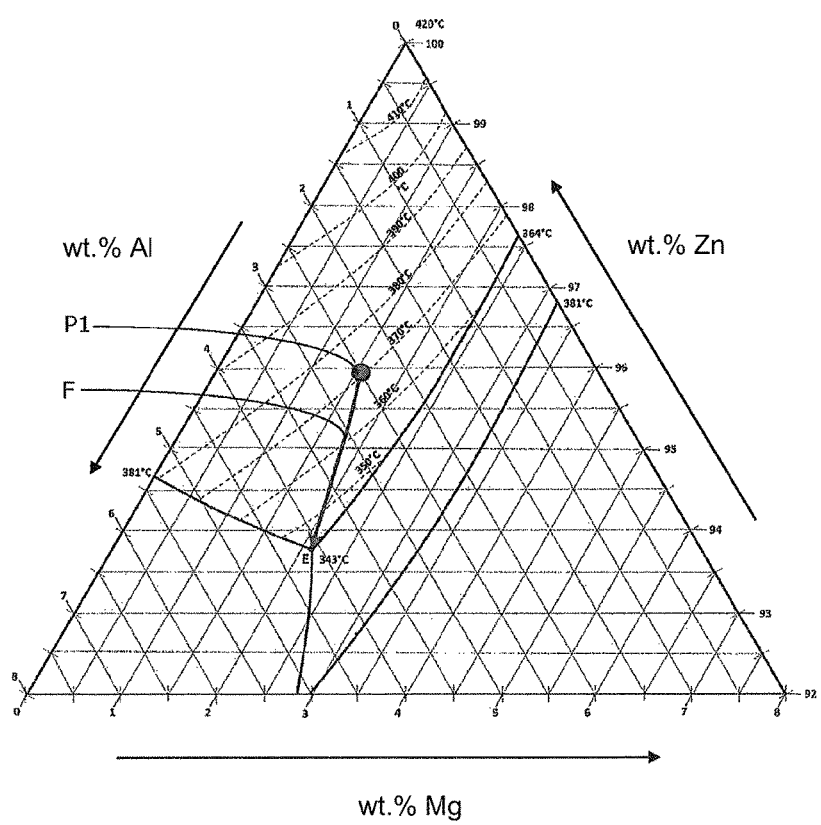
FIG. 2B shows a 2-dimensional representation of the zinc-rich region of FIG. 2A in which the quasi-one-phase solidification path of FIG. 2A was projected in the plane.

FIG. 2A shows a 3-dimensional representation of the fractions of the ternary system Al—Mg—Zn in two-dimensional range. The temperature T is plotted in upward direction into the space. From this representation, the course of the state point in accordance with the invention can be concluded. That is, in FIG. 2A the course of the quasi-single-phase solidification path F* can be seen in three dimensions. The quasi-single-phase solidification path F* runs on a direct path along the curved surface from point P1* to the eutectic point E. FIG. 2B shows a 2-dimensional representation of the zinc-rich region of FIG. 2A. The quasi-single-phase solidification path F* of FIG. 2A was projected into the plane and is now denoted by F. The point P1* of FIG. 2A is referred to as P1 in two dimensions.

The quasi-single-phase solidification path F* runs according to the theory of the invention directly along a curved surface from point P1* to the ternary eutectic point E, as seen in FIG. 2A.

By the specification of a quasi-single-phase solidification path F*, according to the invention one avoids those phase coexistence regions in which the binary eutectic BE solidifies. The binary eutectic BE consists of the MgZn$_2$ phase and the zinc phase. The quasi-single-phase solidification path F* of the invention proceeds deliberately takes such a course that when the melt cools upon emerging from the bath 11 no liquidus intersection line (a liquidus intersection line is also called eutectic valley) is reached. The state point of a melt of the present invention does not proceed along a eutectic valley to the ternary eutectic point E, but it directly aims, according to the invention, at the ternary eutectic point E.

Figure 3:
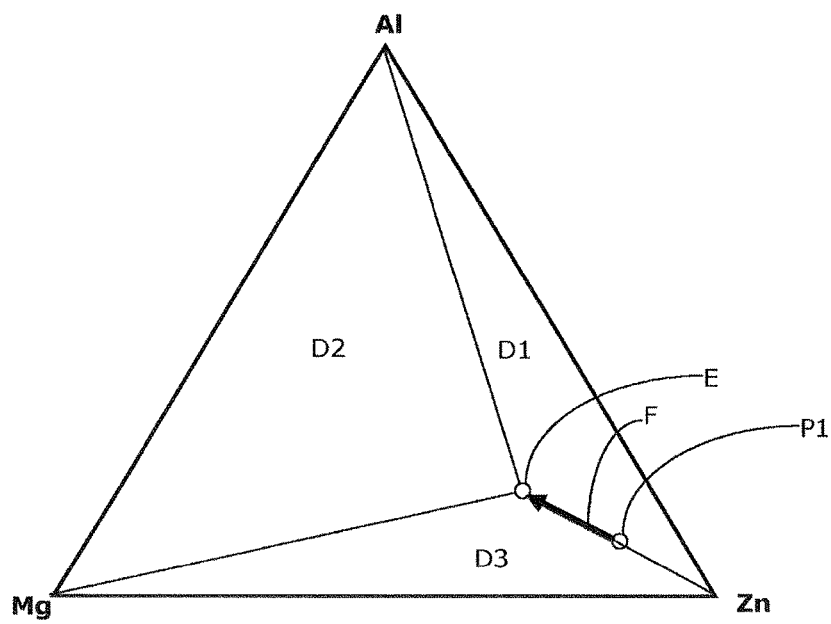
FIG. 3 shows a schematic representation of a further content triangle of the Zn—Al—Mg system, the representation is not to scale.

FIG. 3 shows in highly schematic and not to scale form another content triangle of the Zn—Al—Mg system. The ternary eutectic point E aimed at is denoted by a small circle. The equilateral content triangle is divided into three triangular areas Al-E-Zn-Al (DI), Al-E-Mg-Al (D2), and Mg—Zn-E-Mg (D3). Generally speaking, at cooling of the Zn—Al—Mg system all alloys in the area of the triangular surface Al-E-Zn-Al (DI) show the binary eutectic reaction Zn—Al. All of the alloys in the region of the triangular surface Al-E-Mg-Al (D2) show the binary eutectic reaction Mg—Al and all alloys in the area of the triangular surface Mg—Zn-E Mg (D3) show the binary eutectic reaction Mg—Zn. According to the invention, the solidification path F is set so that it runs in the projection into the two-dimensional from a point P1, as mentioned before, almost along the line Zn-E, in order to avoid the binary eutectic reaction Mg—Zn and the binary eutectic reaction Zn—Al.

Ideally, the solidification according to the new alloy concept takes place exactly along the quasi-single-phase solidification path F*. In practice, however, discrepancy from theoretical considerations arises and one will not always succeed in defining, checking in real time, and readjusting, or controlling by the apparatus 200 respectively, the bath composition (which, for example, can be performed by adding of alloy blocks) in such a way that the ideal single-phase solidification path F* of the theory can be tracked. In connection with the present invention, therefore, one does not speak of unrestricted or "ideal" single-phase solidification path but of a quasi-single-phase solidification path F*. Thereby, a small corridor is allowed, which is oriented along the ideal quasi-single-phase solidification path and leads directly to the ternary eutectic point E.

All binary Mg—Zn ternary phases have a certain solubility for aluminum. This solubility is in the range of a few atomic percent (at %). The aforementioned corridor can therefore allow small aluminum fraction as a second phase, the aluminum content is always less than 5% based on the solids content. Particularly preferred in accordance with the invention are protective coatings in which the aluminum content is always less than 2% based on the solids content. Aluminum as a second phase during solidification is not critical insofar as the Al phase releases comparable solidification heat as the zinc phase. I.e. the Al phase does not "interfere" with the solidification process or the Al phase has no adverse impact on the course of the solidification curve F, which, according to the invention, shall approximately follow the course of the theoretical solidification curve in FIG. 6.

Thus, according to the invention, the composition of the bath is provided such that on solidification of the protective coating 10 on the flat steel product 100, the solidification takes place essentially in two phases, if one considers here the primary zinc as one phase and the ternary eutectic as second phase.

In summary, this can be achieved by setting the following criteria:

the aluminum content (in weight percent) is greater than the magnesium content (in weight percent);
the aluminum content (in weight percent) is in the range between 1.8 and 3.0 weight percent, and preferably in the range between 2 and 2.9 weight percent;
the magnesium content (in weight percent) is in the range between 1.3 and 2.7 weight percent, and preferably in the range between 1.5 and 2.4 weight percent;

the ratio of magnesium content (weight percent) to the sum of the aluminum content (weight percent) and magnesium content (in weight percent) is in the range between 0.31 to 0.44 and preferably in the range from 0.35 to 0.4.

According to the invention a protective layer 10 (see FIG. 9) results on the flat steel product 100, which comprises the following four phase components (except for very small impurities):

the primary zinc dendrites (Z),
the ternary eutectic (TE) consisting of zinc, $MgZn_2$ and aluminum-rich zinc phase, and
small amounts of aluminum-rich zinc phase (A) alone, and
very low levels of the binary eutectic (BE) consisting of zinc and $MgZn_2$;
the proportion of aluminum-rich zinc phase (A) and the binary eutectic (BE) is in all embodiments in sum less than <10%, and preferably in all embodiments <5% of the total coating volume. Preferably, the proportion of the aluminum-rich zinc phase (A) is larger than that of the binary eutectic (BE).

Figure 8:
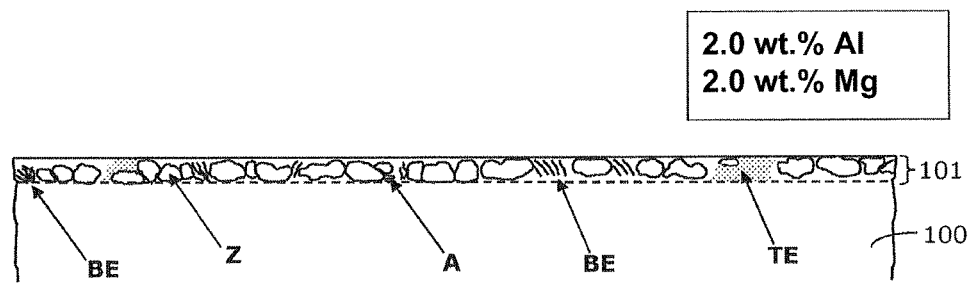
FIG. 8 shows a schematic illustration of a polished cross section through an upper region of a flat steel product and a conventional ZnAlMg protective coating in which the protective coating was produced from an Al—Mg—Zn bath with 2.0 weight percent aluminum and 2.0 weight percent magnesium.
Figure 9:
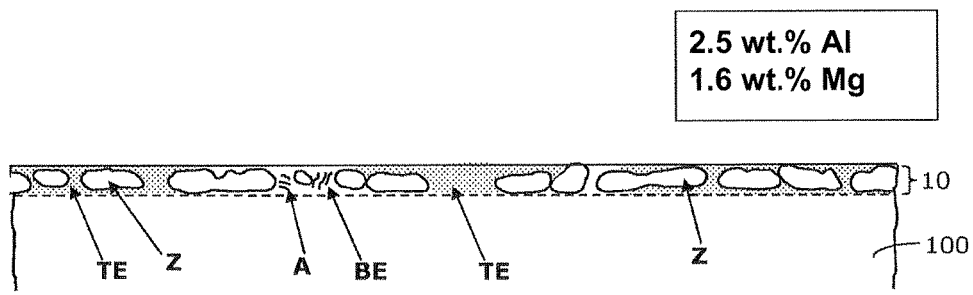
FIG. 9 shows a highly schematic representation of a polished cross section through an upper region of a flat steel product with a ZnAlMg protective coating according to the invention in which this protective coating was produced from an Al—Mg—Zn bath with 2.5 weight percent aluminum and 1.6 weight percent magnesium (the component of the binary eutectic BE is smaller than <10% and preferably <5%)

FIG. 8 shows a highly schematic representation of a transverse polished cut through an upper portion of a flat steel product 100 and through a conventional ZnAlMg protective coating 101, whereby the protective coating 101 was formed from an Al—Mg—Zn-bath with 2.0 weight percent aluminum and 2.0 weight percent magnesium. It is an SEM image of a transverse polished cut, the image was modified for better presentation. SEM stands for scanning electron microscope. It should be noted that the transition from the protective coating 101 to the substrate of the flat steel product 100 typically is not a sharp boundary. In FIG. 8 and FIG. 9 a dashed line therefore indicates this transition. The areas with primary zinc dendrites are marked with a Z and have a kind of bladder or grain form. The areas of the ternary eutectic are denoted by TE. A stands for the aluminum-rich zinc phase. BE identifies areas with binary eutectic (consisting of zinc and $MgZn_2$).

FIG. 9 shows a highly schematic representation of a transverse polished cut through an upper portion of a flat steel product 100 with an inventive ZnAlMg protective coating 10, this special protective layer 10 being made from a Al—Mg—Zn-bath with 2.5 weight percent aluminum and 1.6 weight percent magnesium. This transverse polished cut shows almost exclusively primary zinc dendrites Z surrounded by ternary eutectic TE with very few areas A and only slight traces of BE. Even when converting the new alloy concept, it is possible that there are residuals of A areas. This A areas are acceptable within certain limits and not necessarily a disadvantage. Very small traces of BE can occur, too, the proportion of these in an inventive ZnAlMg protective coating 10 is negligible, as already described.

FIG. 9 shows nonambiguously that the pursuit of a quasi-single-phase solidification path leads to a ZnAlMg protective coating 10, in which for the most part only the first phase, the primary zinc dendrites Z, and, as the second phase, the ternary eutectic TE are present.

In addition, one finds in hot-dip galvanized steel strip products and other hot-dip galvanized flat steel products, an intermetallic layer between the steel substrate of the flat steel product 100 and the coating layer 10. This interlayer, however, is significantly thinner than the coating 10 according to the invention and is therefore not shown in the figures.

It is a clear advantage of the invention that layer coatings 10 with excellent properties can be produced already at bath temperatures of less than 460 degrees Celsius. Thus, steel flat products 100 may be coated, where typical surface defects would occur at higher bath temperatures.

An apparatus 200 (see, e.g. FIG. 10), which is operated according to the invention preferably has a strip entry temperature of the flat steel product 100 which is between 400 to 490 degrees Celsius. Particularly preferred is a strip entry temperature from 420 to 480 degrees Celsius.

The flat steel product 100 according to the invention is preferably passed through a molten zinc alloy bath 11 with alloy composition according to the invention having a bath temperature of 400-480 degrees Celsius. Particularly preferred is a bath temperature between 420 and 475 degrees Celsius.

By adding of alloy blocks the composition of the molten zinc alloy bath 11 can be adjusted as required, in order to meet the requirements in terms of alloy composition according the invention.

With the invention, flat steel products 100 can be produced which have a protective coating 10 having the following composition:

an aluminum content, in the range between 1.8 plus/minus 0.2 weight percent and 3 plus/minus 0.2 weight percent; and
a magnesium content, in the range between 1.3 plus/minus 0.2 weight percent and 2.7 plus/minus 0.2 weight percent, wherein the aluminum content in weight percent is greater than the magnesium content in weight percent.

Preferably, another or more additional alloying elements selected from the group silicon, lithium, titanium, boron, beryllium, yttrium, zirconium, phosphorus, can be added to the molten alloy bath 11, wherein the content of each of the additional alloying elements is less than 0.1 weight percent. With these additional alloying elements, the properties of the protective coating 10 can be modified as needed.

Figure 10:
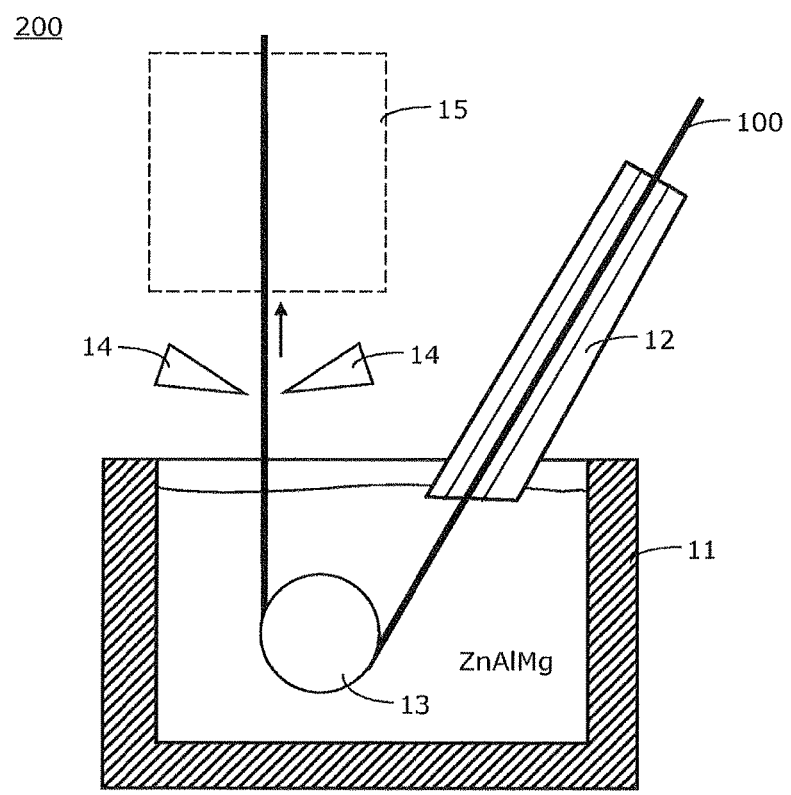
FIG. 10 shows a highly schematic representation of a known apparatus for hot-dip galvanizing.

The invention enables a more stable driving of an apparatus 200 as shown in FIG. 10. Better surface qualities can be achieved reproducibly, since the alloy composition before solidification admits more degrees of freedom (in the sense of a larger production window) in the time the quasi-single-phase solidification path is followed.

It is important that the present alloy concept allows more degrees of freedom (in the sense of a larger production window) for optimizing the stripping process for emerging of the steel strip 100 from the molten bath 11 and for stripping by nozzles 14 (see FIG. 10). The invention enables to adjust and optimize the slit opening d of the nozzles 14 and/or the distance z of the nozzles from the steel strip 100 upon emerging and stripping of in wide ranges, in order to achieve the desired overall result.

Figure 11:
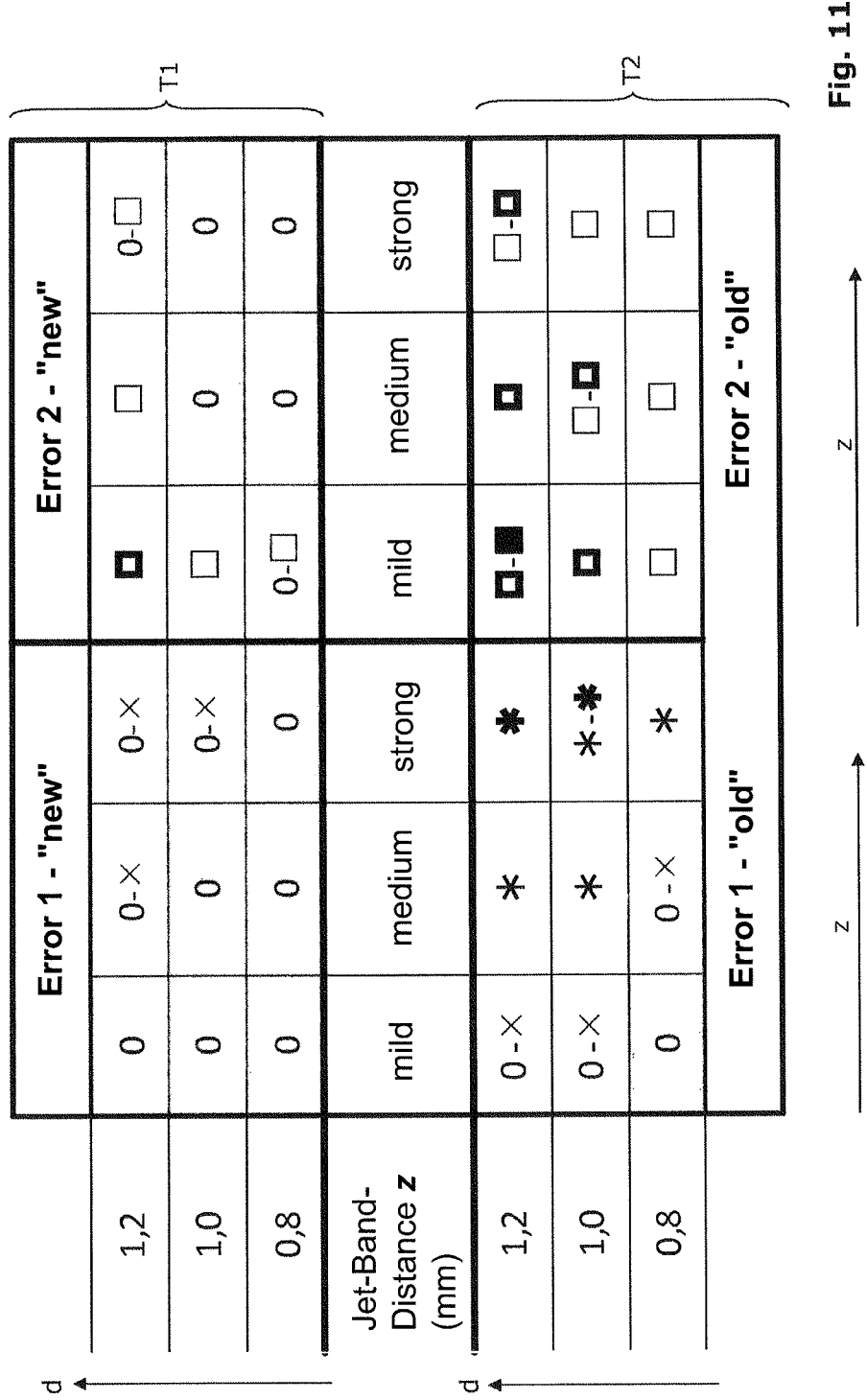
FIG. 11 shows a highly schematic tabular representation of the intensity of errors which occur in a conventional Zn—Mg—Al protective coating in comparison to the protective coating according to the invention.

According to the invention, the occurrence of error patterns (such as ZnAlMg stripping disturbance and surface topography error) were significantly reduced by stripping after emersion, as shown by the tabular representation in FIG. 11. FIG. 11 shows a table with an upper portion T1 and a lower portion T2. In the upper portion TI, the error rate for coatings 10 on a steel strip 100 according to the invention [for the specific composition Al=2.6 wt % and 1.6 wt % Mg] is shown, wherein here two different types of errors are discriminated, which are referred to as error 1 and as error 2. In the lower section T2 by contrast, the incidence of errors in conventional Zn—Mg—Al coatings on a steel strip 100 is shown. Again, two different types of errors are displayed.

On the z-axis a small, medium and large distance z (in millimeters) from nozzle to strip were plotted, respectively. A small distance z from nozzle to strip is in the range of 3-5 mm, an average distance z from nozzle to strip is in the range of 6-8 mm and a large distance z from nozzle to strip is in the range of 9-14 mm.

On the d-axis the slit opening d is plotted in millimeters (plus/minus 0.05 mm), in which case three discrete values are given as follows: d=0.8 mm, d=1.0 mm and d=1.2 mm.

In the individual fields of the table, the intensities of error 1 and 2 as a function of the stripping parameters z and d is shown in the form of symbols. The following legend explains the meaning of the various symbols:

| | |
|---|---|
| no errors | 0 |
| mild | X or ☐ |
| medium | * or ◪ |
| strong | ✳ or ■ |

In order to improve the readability of the table, the fields, which show no error or error in which the intensity is only mild, have dark gray or light gray background. Fields in the table having white background represent a failure intensity, ranging from mild to medium, medium, medium to strong or strong.

It can be seen that for conventional Zn—Mg—Al layer coatings (in the lower section T2) only two fields have no error 1 or none to slight errors 1 (the two fields at the bottom left of the table, having dark gray and light gray background). All other fields show significantly more errors 1 and errors 2. In contrast, the incidence of errors in the inventive coatings 10 in relation to the error 1 is clearly better. All fields in the upper left of the table TI have therefore dark gray and light gray background. As for the error 2, only three fields in TI are highlighted in white. These are the following fields: d=1.0 mm and z=small; d=1.2 mm and z=small; d=1.1 mm and z=medium.

Considering now the so-called intersection of errors 1 and 2, it is clear that very few errors during the following parameters occur in coatings 10 according to the present invention (section TI): d=0.8 mm and z=small; d=0.8 mm and z=medium; d=0.8 mm and z=large; d=1.0 mm and z=medium; d=1.0 mm and z=big. In conventional layer coatings (section T2), however, there are hardly any error only with the following parameters: d=0.8 mm and z=small. All other fields in the section T2 are therefore virtually taboo for production.

It has thus been shown that the setting of physical parameters (the slit opening d of the nozzles and/or the distance z of the nozzles from the steel strip) for emerging and stripping is possible in larger parameter windows than before without such adjustments causing an increase in the error patterns on the steel tape.

Furthermore—depending on the implementation of the inventive alloy concept—the production costs and the energy required for the protective coating 10 are lower than for comparable methods.

According to the invention, the alloy components (especially the aluminum and magnesium content) have been chosen so that the lowest possible energy consumption (or optimal energy balance) is achieved. On the one hand, the direct energy consumption during melting, coating and stripping plays a role. On the other hand, the energy consumption of the starting materials has a significant impact. The following additional explanatory details are given.

When optimizing the energy consumption, among other things, the density of the protective coating 10 plays a role. Because of around 5.924 at % aluminum and about 4.047 at % magnesium, the inventive alloy has a lower density by about 7% compared to pure zinc or zinc-iron. This means that in the inventive alloy—regardless of, inter alia, the better corrosion protection due to chemical reasons—a reduction of the film coating weight (weight of the protective coating 10) by 7% still results in the same layer thickness as zinc or zinc-iron layers. In a purely mechanical view, the same protection for the steel strip 100 is still given due to the same layer thickness despite the reduction in the film coating weight by 7%.

Usually this aspect, which is of physical or mechanical nature, is ignored due to the potential savings in coating that are corrosion technically justifiable. Theoretically, a significant increase in the proportion of light alloy elements would therefore be quite positive in terms of the reduction of the specific weight of the coating, but economic and environmental considerations speak against it, as shown below.

Here, the standard electrode potentials of the alloying elements are given:
Zn: −0.7926 V;
Al: −1.676 V;
Mg: −2.372 V The standard potentials indicate already that energy costs of different height are required for the production of the respective pure metals.

The following energies for the production of 1 kg of pure metal are needed (the values given here are cited from "Leichtbau: Prinzip, Werkstoffauswah und Fertigungsvarianten", edited by Hans Peter Degischer/TU Wien/Institut für Werkstoffwissenschaften und Werkstofftechnologie/and Sigrid Lüftl/TU Wien/Institut für Werkstoffwissenschaften und Werkstofftechnologie/Nichtmetallische Werkstoffe/, Verlag WILEY-VCH):
Primary pure zinc: approx. 90 MJ
Secondary pure zinc: approx. 17 MJ
Primary pure aluminum: approx. 210 MJ
Recycled pure aluminum: approx. 18 MJ
Primary pure magnesium: approx. 130 MJ
Recycling pure magnesium: approx. 18 MJ Excluding the melting heat (Zn: approx. 112 kJ/kg; Mg: approx. 358 kJ/kg; Al: approx. 397 kJ/kg), which with increasing amounts of Al and Mg in the alloy lead to further energy losses, mainly caused by cooling, therefore it can be deduced that the energy required for the production of ZnMgAl alloys increases significantly with increasing alloy content. This statement is related to the mass. In the case of an inventive alloy with 2.5% aluminum and 1.6% magnesium energy consumption results, which is increased by approximately 7% in comparison to pure zinc to produce the respective pure metals.

However, for a constant thickness of the coating 10, the weight or mass of the coating 10 decreases—as already mentioned—with increasing alloying contents due to the specific light alloy elements, which ostensibly equalizes the energy balance to a large extent.

The recycling rates for zinc, aluminum and magnesium and any losses in the process were not taken into account for the calculation of the average energy consumption here.

What is claimed is:

1. A method for applying a protective coating (10) on a flat steel product (100), wherein the protective coating (10) is produced by guiding the flat steel product (100) having a strip entry temperature in the range between 400 and 490 degrees Celsius through a molten zinc alloy bath (11), wherein the molten zinc alloy bath (11) has a bath temperature in the range from 400 to 480 degrees Celsius and has an aluminum content and a magnesium content, wherein the molten zinc alloy bath (11) has a composition which is adjusted as follows:

the aluminum content lies in the range between 2.0 and 2.9 weight percent;

the magnesium content lies in the range between 1.5 and 2.4 weight percent;

the aluminum content in weight percent is greater than the magnesium content in weight percent;

the ratio of the magnesium content in weight percent to the sum of the aluminum content in weight percent and the magnesium content in weight percent lies in the range between 0.34 and 0.40; and the remainder of the molten zinc alloy bath (11) are zinc and unavoidable impurities, characterized in that a theoretical cooling curve for an alloy composition of the molten zinc alloy bath (11) is calculated such that a $Mg_2Zn_{11}$-phase is excluded and in that in the molten zinc alloy bath (11) before the solidification of the ternary eutectic (TE) a solid content of primary zinc dendrites results, which lies in the range between 0.4 and 0.6 molar fraction of the solid content of the molten zinc alloy bath (11), and in that a cooling rate for solidifying the molten zinc alloy in a solidification process on the flat steel product (100) is adjusted based on the calculated theoretical cooling curve; and is controlled in an apparatus (200) applying control technology using nozzles (14).

2. The method according to claim 1, characterized in that in a process step the composition of the molten zinc alloy bath (11) is controlled by maintaining the composition of the molten zinc alloy bath, such that primary zinc dendrites (Z) and ternary eutectic (TE) are formed on the flat steel product (100) during solidification.

3. The method according to claim 2, characterized in that during solidification on the flat steel product (100) a small residue of aluminum-rich zinc phases (A) and of the binary eutectic (BE) is formed, which in sum comprise less than <10% of the total volume of the coating.

4. The method according to claim 3, characterized in that during solidification on the flat steel product (100) a small residue of aluminum-rich zinc phases (A) and of the binary eutectic (BE) is formed, which in sum comprise less than <5% of the total volume of the coating.

5. The method according to claim 2, characterized in that the solidification process on the flat steel product (100) is controlled in an apparatus (200) applying control technology, wherein in the molten zinc alloy bath (11), before a final eutectic solidification, a solid content results, which lies below 55%.

6. The method according to claim 1, characterized in that the solidification process on the flat steel product (100) is controlled in an apparatus (200) applying control technology, wherein in the molten zinc alloy bath (11), before a final eutectic solidification, a solid content results, which lies below 55%.

7. The method according to claim 1, comprising a process step in which the composition of the molten zinc alloy bath (11) is controlled such that the magnesium content in the molten zinc alloy bath (11) and thus also in the protective coating (10) is always 21% to 45% lower than the aluminum content.

8. The method according to claim 1, characterized in that in a process step, the composition of the molten zinc alloy bath (11) is readjusted by adding blocks of alloy.

9. The method according to claim 1, characterized in that one or more further alloying elements from the group of silicon, lithium, titanium, boron, beryllium, yttrium, zirconium, and phosphorus are added to the molten zinc alloy bath (11), and wherein the content of each element is less than 0.1 percent per weight.

\* \* \* \* \*